United States Patent Office 3,558,495
Patented Jan. 26, 1971

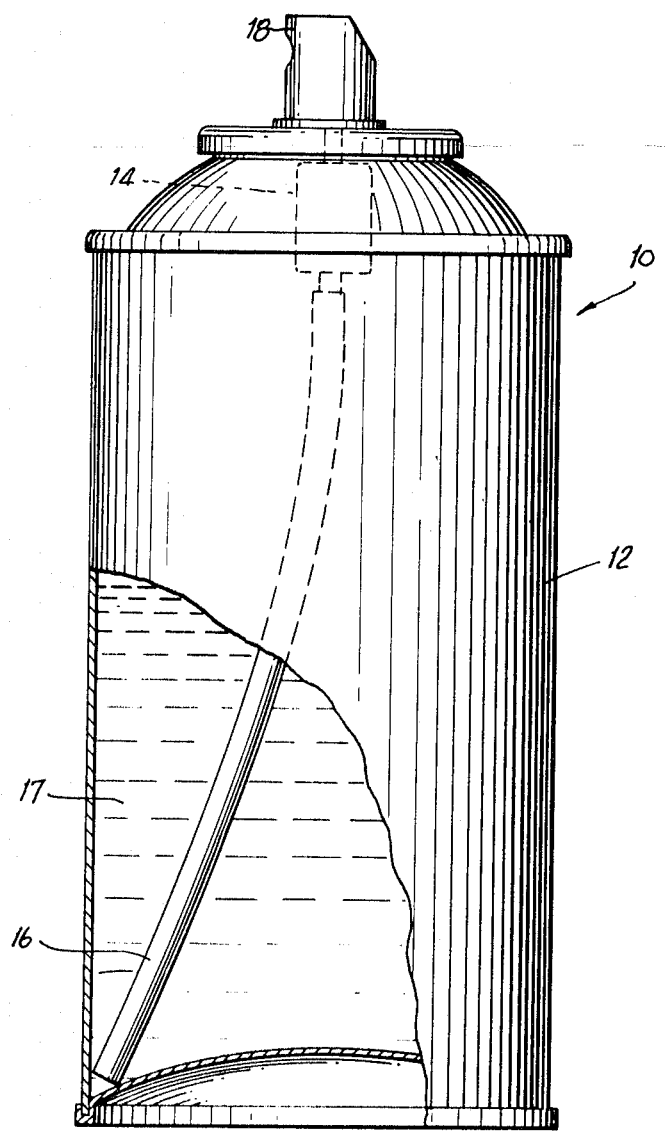

3,558,495
MULTI-PURPOSE CLEANER
Harry W. Mace, Milford, Conn., assignor to Aerosol Techniques Research Center, Inc., Milford, Conn., a corporation of New York
Filed Jan. 24, 1969, Ser. No. 793,795
Int. Cl. C11d 17/08
U.S. Cl. 252—90     2 Claims

ABSTRACT OF THE DISCLOSURE

A valved tin-plated aerosol can containing a pressurized gas propellant and a multi-purpose liquid cleaning composition which is dispensed in the form of a stable pressure-breakable foam. The composition is composed of a critically proportioned mixture of a triethanolamine lower alkyl (C8–12) benzene sulphonate, sodium orthosilicate, tetrapotassium pyrophosphate, a diethanolamine-fatty acid amide wherein the fatty acid is lauric acid and/or cocoa acid, ethylene glycol monobutylether, ortho phenyl phenol, 4-chloro-2-cyclopentyl phenol, a volatile hydrocarbon containing 8–11 carbon atoms and water.

BACKGROUND OF THE INVENTION (1) Field of the invention

A valved tin-plated aerosol can containing a water-based liquid cleaning composition including a mixture of a solvent cleaner, a builder and sequestering cleaner, an alkalizer cleaner and a surfactant cleaner.

(2) Description of the prior art

Various types of multi-purpose liquid cleaners capable of removing a wide variety of different kinds of soils and stains have been proposed heretofore. Basically these are of two different types. One was dispensed from a non-pressurized container, as by pouring or pumping, the other from a pressurized aerosol container.

The non-pressurized type of cleaner has certain well-known drawbacks, to wit (a) difficulty in application, i.e., the necessity of hand spreading on a surface or of finger operation of a pump that conventionally is attached to the mouth of the container and (b) non-uniformity of application.

The aerosol dispenser type of cleaning composition has different drawbacks which are caused by the particular formulations employed. For example, three-phase layering is present in the container which, unless the container is thoroughly shaken prior to dispensing use, causes a change in efficacy as the contents are progressively discharged. Also, precipitation takes place in the container resulting in complete or partial clogging of the valve and of the spray orifice. The main cause of precipitation is the presence of silicate salts that are used in alkalizers when the same are employed in high concentrations. The precipitation is caused by acidification reactions with the tin lining of the can that additionally results in detinning of the can. Sometimes the detinning continues to a point that the pressurized can is no longer safe to handle. Furthermore, some formulations containing sodium silicate deposit a coating of silicon dioxide on glass surfaces under certain conditions. The silicon dioxide tightly adheres to the glass so that it is not readily removeable. This is considered to be a serious product deficiency. Still another problem relates to foam control. A defect in many of the formulations is that the foam produced is such a tight, i.e., stable, foam that it partially remains a foam even when a householder wipes over a foam covered surface, so that some streaking ensues. On the other hand, if the stability of the foam is reduced, the tendency is for the foam to break too rapidly and leave a watery deposit which will not cling readily to overhead and vertical surfaces but coalesces and drops, or runs in rivulets. Still further, cleaners of both types are prone to create certain hazards, for instance, vapor inhalation hazards or skin irritation or eye irritation, the latter for instance, taking place where quaternaries are employed as germicides, particularly in alkaline solutions. Yet another disadvantage is that the solder inside a tin-plated can be attacked by the cleaner to failure, particularly where detinning continues beyond the point of oxygen consumption of the air trapped in the head of the can during filling. On the other hand, if no detinning takes place, the oxygen eventually will rust pin points of exposed iron through inevitable tiny flaws in the tin coating causing ultimate perforation and can failure.

The art has not been able to successfully select and balance the compounds in the formulations employed in a manner such as to overcome these deficiencies.

Nor can one overlook the failure of the art to produce a multi-purpose cleaner which provide an excellent cleaning coefficient, i.e., a cleaner which will clean practically every type of unwanted deposit which may be present on a surface and will do so without seriously attacking the surface itself.

Typical of the prior art formulations which are believed to be the closest to the present invention are:

EXAMPLE A

|  | Percent by weight |
|---|---|
| Sodium alkyl benzene sulphonate (C10 to 12) | 0.6 |
| Linear aliphatic polyethoxylated alcohol | 2.4 |
| Ethylene diamine tetraacetic acid-tetra sodium salt, 38% water solution | 2.6 |
| Ethylene glycol monobutylether | 3.0 |
| Tetrapotassium pyrophosphate | 1.2 |
| Sodium metasilicate | 0.5 |
| Isopropanol | 1.0 |
| Deionized water q.s. to 100. | |

This material is specifically designed for dispensing from a non-pressurized container by pouring or spraying with a pump dispenser. However, it can be rendered dispensable in aerosol form by packing the same in a conventional pressurized container and including a suitable propellant, for instance by substituting five parts by weight of isobutane under pressure for five parts of water.

EXAMPLE B

|  | Percent by weight |
|---|---|
| Triethanolamine alkyl (C10 to 12) benzene sulphonate | 0.3 |
| Diethanolamine lauric acid amide | 0.2 |
| Ethylene glycol monobutylether | 7.0 |
| Tetrapotassium pyrophosphate | 1.0 |
| Sodium metasilicate | 1.0 |
| Ortho phenyl phenol | 0.1 |
| 4-chloro-2-cyclopentylphenol | 0.08 |
| 3,4,5-tribromosalicylanilide | 0.02 |
| Isobutane | 5.0 |
| Deionized water q.s. to 100. | |

The formulation of this example is packed in an aerosol bomb under usual pressure.

The advantage of embodying any cleaning formulation in an aerosol can is that application thereof is far easier in that no pumping is required and also in that the material dispensed is in the form of a thin uniform foam which, due to its slight thickness, does not tend to run off vertical surfaces with consequent streaking of such surfaces.

SUMMARY OF THE INVENTION

It is an object of the present invention to provide a pressurized multi-purpose cleaner which avoids the above stated drawbacks of the prior art.

It is another object of the invention to provide a multi-purpose cleaner of the character described which is efficacious and can be packed in an aerosol can and dispensed therefrom without clogging the valve.

It is another object of the invention to provide a multi-purpose cleaner of the character described having a high pH and which is a disinfectant against household bacteria, mold and mildew.

It is another object of the invention to provide a multi-purpose cleaner of the character described which will deposit a stable foam on a vertical surface, the durability of which can be controlled by proper proportioning of the ingredients in the formulation.

It is another object of the invention to provide a multi-purpose cleaner of the character described which is safe to use and is not irritating to mucous membranes, the eyes and the skin, even skin which has been freshly wounded or scarred or upon which eruptions are present.

It is another object of the invention to provide a multi-purpose cleaner of the character described which is essentially free from vapor inhalation hazards and from over-concentration of salts and surfactants, as well as being non-toxic.

It is another object of the invention to provide a multi-purpose cleaner of the character described which has an excellent cleaning power, a high cleaning coefficient, practically non-existent precipitation, good foam control and excellent germicidal adaptability.

It is another object of the invention to provide a multi-purpose cleaner of the character described which does not form three liquid phases in a container and which does not generate hydrogen in the container.

It is another object of the invention to provide a multi-purpose cleaner of the character described which does not leave a residue on glass.

It is another object of the invention to provide a multi-purpose cleaner of the character described which is comparatively inexpensive to formulate, i.e., which includes ingredients the total cost of which and the quantities used are relatively small so that the cleaner can be marketed at a low cost to the public despite its many desirable attributes.

It is another object of the invention to provide a multi-purpose cleaner of the character described which has an excellent shelf life both in the sense that it is freeze/thaw stable and does not degenerate upon standing, and does not maintain a continuous attack on the lining ad sheet-metal of the container.

Other objects of the invention in part will be obvious and in part will be pointed out hereinafter.

The invention accordingly consists in the composition which will be exemplified in the following description and of which the scope of application will be indicated in the appended claims.

BRIEF DESCRIPTION OF THE DRAWINGS

In the accompanying drawing the sole figure illustrates a partially fragmentary side view of an aerosol dispenser containing a composition embodying the present invention.

DESCRIPTION OF THE PREFERRED EMBODIMENT

According to the instant invention the cleaning composition, i.e., the novel multi-purpose cleaner including the propellant, which are conjointly indicated by the reference numeral 10 in the single figure of the drawing, is packaged in an aerosol can 12. At the top of the can is a valve 14 connected to the interior of the can by a dip tube 16. The valve is of the standard type and when depressed will discharge the cleaning composition 17, including the propellant, through a nozzle 18 as a foam onto a surface which is to be cleaned.

The basic novelty of the present invention resides in the selection of the specific ingredients of the formulation and their specific proportions in order to obtain the advantages detailed. The particular ingredients are not per se novel. Single ones of the ingredients have been employed heretofore in various cleaners and indeed combinations of two or more of the ingredients have been used prior to the present invention. The closest formulations which are known are the ones given in the Examples A and B above. However, it will be seen subsequently that even these formulations, as close as they may be, suffer from various deficiencies all of which are overcome by the present very closely controlled formulation of the instant invention. Hence, before discussing certain specific deficiencies which the formulation of the present multi-purpose cleaner overcomes there will be set forth below the unique new formulation both as to its constituents and as to ranges and proportions, and as to the preferred embodiment. Said new formulation of the invention will be identified as:

EXAMPLE C

| | Preferred percent by weight | Ranges in percent by weight |
|---|---|---|
| Water soluble salt of alkyl benzene sulphonic acid [1] | 0.3 | 0.2–0.5 |
| Sodium orthosilicate | 0.5 | 0.4–0.55 |
| Tetrapotassium pyrophosphate | 0.5 | 0.4–0.55 |
| Diethanolamine lauric and/or cocoa acid amide | 0.2 | 0.2–0.4 |
| Ethylene glycol monobutylether | 7.0 | 5.0–7.5 |
| Orthophenyl phenol | 0.1 | 0.0–0.2 |
| 4-chloro-2-cyclopentolphenol | 0.08 | 0.08–0.2 |
| Volatile hydrocarbon [2] | 0.5 | 0–1.0 |
| Deionized water, quantity sufficient to | 95 | 94–97 |
| Propellant, isobutane preferred | 5.0 | 3–6 |

[1] Wherein the number of carbon atoms for the alkyl group ranges from 8 to 12 with 12 being preferred, and wherein the triethanolamine salt is the preferred salt.
[2] Containing at least 45% aliphatic hydrocarbons (C8–12) not in excess of 20% aromatic hydrocarbons and not in excess of 40% naphthenic hydrocarbons, initial boiling point 240° F.–350° F., dry point 280° F.–400° F.

By way of further identification of the volatile hydrocarbons, the following commercial hydrocarbons are acceptable in the practice of the invention:

Isopar E and Isopar H which are made by Humble Oil and Refining Company, and Shell Sol 335, Mineral Spirits 135 (WR), Mineral Spirits 135 (H) and Mineral Spirits 150 sold by Shell Chemical Company.

For the purpose of further identification of the solvents, the aromatic, naphthenic and paraffenic contents, as well as the IBP and DP of these materials, together with certain other pinpointing characteristics are set forth below:

| | Aromatics, percent volume | Naphthenes, percent volume | Paraffins, percent volume | IBP, °F. | DP, °F. | Specific gravity, 60/60° F. | Gravity, °API | Flash point, TCC °F. | Aniline point, °F. | Viscosity cps., 25° C. |
|---|---|---|---|---|---|---|---|---|---|---|
| Solvent: | | | | | | | | | | |
| Isopar E | [1] <0.2 | (2) | (2) | 240 | 286 | 0.7227 | 64.3 | <45 | 168 | 0.850 |
| Isopar H | [1] <0.2 | (2) | (2) | 350 | 371 | 0.7571 | 55.4 | 123 | 183 | 1.310 |
| Shell Sol 335 | 18 | 37 | 45 | 315 | 336 | 0.788 | 48.0 | 102 | 120 | 0.80 |
| Mineral spirits 135 (WR) | 16 | 40 | 44 | 324 | 385 | 0.789 | 47.0 | 112 | 131 | 0.95 |
| Mineral spirits 135 (H) | 16 | 36 | 48 | 326 | 390 | 0.788 | 48.0 | 112 | 132 | 0.97 |
| Mineral spirits 150 | 10 | 21 | 69 | 321 | 370 | 0.775 | 51.0 | 108 | 149 | 1.08 |

[1] By weight. [2] Negligible balance.

In the preferred formulation of the invention the triethanolamine alkyl benzene sulphonate has 12 carbon atoms, the amide is diethanolamine lauric acid amide and the volatile hydrocarbon is Isopar E. Although isobutane is the most desirable propellant other well-known propellants can be employed in lieu thereof.

In the foregoing formulation four types of cleaners are present, to wit, a solvent cleaner, a builder and sequestering agent, an alkalizer and a surfactant. The solvent cleaner is ethylene glycol monobutylether. The solvent cleaner must be characterized by its low vapor pressure so that it does not evaporate too quickly. It should have a solvent power for oils and indeed should be a substantially universal solvent. It is present primarily to remove oil and grease stains.

The building and sequestering agent is sodium orthosilicate and tetrapotassium pyrophosphate. The function of the building and sequestering agent is to hold soils in suspension whereby to prevent redeposition thereof. It also solubilizes and holds in suspension soap scums formed from hard water. It is primarily used, as will be appreciated, to remove scums and heterogeneous soils.

The alkalizer is sodium orthosilicate. Its function is to cut grease.

The surfactant is triethanolamine alkyl benzene sulphonate and diethanolamine lauric and/or cocoa acid amides. The function thereof is to remove and suspend heterogeneous dirt.

In general the functions of the ingredients in Example C which is the formulation of the present invention are, including both the functions given above and additional (secondary) ones which will be discussed in some detail below, as follows:

Sodium orthosilicate is an alkalizer and a builder and sequestering agent. It also assures $O_2$ consumption.

Tetrapotassium pyrophosphate is an alkalizer and a builder and sequestering agent.

The water-soluble salt of alkyl benzene sulphonic acid is a surfactant and also is a foaming agent.

Diethanolamine lauric and/or cocoa acid amide is a solubilizing agent and also a surfactant.

Ethylene glycol monobutylether is a solvent and also is a carrier for a germicide.

4-chloro-2-cyclopentol phenol is the primary germicide.

Orthophenyl phenol is a secondary germicide.

The volatile hydrocarbon is a foam breaker.

As mentioned earlier, the closest prior art of which cognizance is presently had is represented by Examples A and B. Also as mentioned, presently there is nothing new in the individual use of any of the single chemicals utilized in the formulation of the present invention, i.e., the various individual chemicals have been used in different cleaning compositions. The present invention resides in the discovery of the very narrow band of compositions and narrow ranges of proportions that not only makes the product of the present invention safe to package and use in the aerosol cans, but also develops good germicidal power and yields a foam that can be tailored to any desired degree of permanence, the latter by balancing the amounts of surfactant and foam breaker used. The greater the amount of surfactant within the range given, the more stable the foam will be and the lesser the amount of the foam breaker the more stable the foam will be. Conversely, the lower the amount of surfactant and the greater the amount of foam breaker the less stable the foam will be, of course all within the ranges indicated.

The nature and amount of each of the ingredients within the ranges given is critical and by virtue thereof a unique combination has been arrived at which has provided a commercial and functional substantial superiority.

There are several features by which multi-purpose cleaners are rated. The primary ones are cleaning power, cleaning coefficient, precipitation, hydrogen generation, effect on glass, whether or not three liquid phases are formed, foam control and germicidal adaptability. Each of these will be discussed in some detail below. It suffices to say, at this point, that a deficiency in any one of these features is enough to make a formulation unsuitable for commercial aerosol packaging and sale. By way of contrast, there are tabulated below the ratings of Examples A and B of the prior art and Example C of the invention for each of these features. In the case of Example C the rating applies not only to the preferred proportioning of the ingredients of the formulation but to all proportions within the ranges given:

| Features | Example A | Example B | Example C |
| --- | --- | --- | --- |
| Cleaning power | Weak | OK | OK |
| Cleaning coefficient | 0.58 | 0.78 | 0.82 |
| Precipitation | Slight | Moderate | Negligible |
| Hydrogen generation | Continues | Stops | Stops |
| Effect on glass | No residue | Definite residue | No residue |
| Formation of three liquid phases | Yes | Yes | No |
| Foam control | None | OK | OK |
| Germicidal adaptability | Questionable | OK | OK |

It will aid to the understanding of the present invention to discuss each of these features in some detail, although not necessarily in the order in which they are listed in the rating table above.

FORMULATION OF THREE LIQUID PHASES

In aerosol cans it is most undesirable to have three liquid phases present because very frequently, despite elaborate instructions and stringent printed warnings, a can is actuated without being shaken to mix the layers together. With only two layers present and with one of these layers largely propellant, misuse of the can, i.e., use without shaking, will at worst result in a poor spray pattern. However, when there are three liquid layers present at the time of dispensal, the upper non-propellant layer will increase with respect to the lower non-propellant layer. In cleaner formulations where this upper layer is the monobutylether of ethylene glycol, not only will there be a change in efficacy as the can is used, with the monobutylether of ethylene glycol not being dispensed if shaking is forgotten, but the monobutylether of ethylene glycol could by virtue of its early non-dispensal increase to the level where it soon represents a real health hazard. The principal reason for the formation of the third layer in Examples A and B are the presence of the monobutylether of ethylene glycol and the tetrapotassium pyrophosphate in the amounts specified.

The present invention removes this difficulty by reducing the amount of tetrapotassium pyrophosphate to a point at which it still functions and by substituting sodium orthosilicate for sodium metasilicate. Moreover, by employing the specific ingredients in the proportions given above the monobutylether of ethylene glycol dissolves in the non-propellant cleaner layer and does not form a separate layer.

PRECIPITATION

It is of utmost importance that precipitation be maintained at a very low level—this to avoid the clogging of the aerosol dispensing valve. Precipitation forms salts and the salt crystals easily can grow to a size where they will partially or completely block the orifice in the nozzle. The main causes of precipitation are silicate salts. The precipitation is brought about by acidification reactions such as the detinning reaction with the tin plate of the can. As a given amount of detinning will acidify a given quantity of silicate, the hazard of precipitation due to acidification is greater with lower alkali concentrations. Precipitation also is due to the formation of insoluble tin silicate compounds. Furthermore, higher silicate concentrations more readily form the undesirable precipitate.

The tetrapotassium pyrophosphate included in the formulation of the invention tend to solubilize the silicate precipitates. It is to be observed that dangerous precipitation usually occurs at the propellant/concentrate interface.

It should be noted that in the case of vacuum sealing of the cans where most of the air in the head space is removed, the can surface adjacent to the propellant phase is completely detinned whereas the surface in contact with the highly alkaline cleaner concentrate is only slightly detinned. From this it may be deduced that the first reaction which takes place is the absorption of oxygen into the propellant cleaner phase where part of the monobutylether of ethylene glycol is dissolved. This is followed by formation of an organic tin complex. The precipitate is formed where the organic complex contacts the concentrate (silicate solution).

Accordingly the factors causing unwanted precipitation are:

(1) Low alkali where acidifying reactions become significant.

(2) High silicate content.

(3) High salt—the monobutylether of ethylene glycol is salted out into the propellant phase causing faster localized detinning.

It is believed that the detinning process in the can proceeds in accordance with the following formulae:

(1) $3H_2O + Na_4SiO_4 + O_2 + Sn \rightarrow Na_2SiO_3 +$ 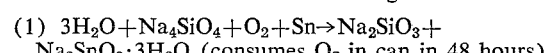
$Na_2SnO_3 \cdot 3H_2O$ (consumes $O_2$ in can in 48 hours)

(2) $Na_2SnO_3 \cdot 3H_2O + Sn \rightarrow 2NaHSnO_2 + 2H_2O$ (in 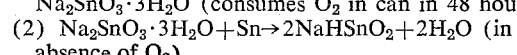
absence of $O_2$)

(3) $Sn + Na_2SiO_3 + H_2O \rightarrow H_2 + NaHSnO_2 +$ 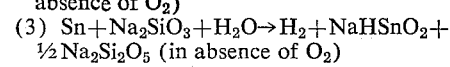
$\frac{1}{2}Na_2Si_2O_5$ (in absence of $O_2$)

With some prior surfactants and particularly when the can has been packed under high air conditions, i.e., high air content in the head space which reduces the total alkalinity in the system, detinning has been observed to take place beyond the amount which could be explained by Equation 1 which requires the presence of oxygen. Of course, it will be understood that a small percentage of high air content cans is unavoidable in a commercial run so that provision must be made in a commercially acceptable formulation, and is made in the formulation of the present invention, to take into account the possibility of a high amount of air in an occasional can.

Detinning can also, as noted previously, take place in the absence of oxygen and this detinning frequently results in corrosion of the solder at the can seam to a point where solder failure results.

Equations 2 and 3 above show two possible alternate mechanisms wherein tin is consumed in the absence of oxygen. Both of these reactions move toward completion when $NaHSnO_2$ is removed from equilibrium. It is thought that surfactants containing ethylene oxide which show the ability to continue the detinning action beyond one week form a metal-organic complex with the sodium bistannite, driving the reaction toward the right. The polyethoxylated alcohol of Example A is such a surfactant. The sodium bistannite would not be stable in the presence of air.

HYDROGEN FORMATION

Under ideal conditions, the detinning reaction will take place inside a can until the oxygen in the head space is fully consumed and then it will stop. This usually takes place in from 2 to 3 days. However, in many prior art formulations, particularly where none of the air had been removed in sealing the can, and this unavoidably happens to a percentage of cans made in a commercial run, the detinning continues beyond the point of oxygen consumption, denoting hydrogen formation. Although this reaction is slower than the oxygen consumption, it will continue as long as water is present (see Equations 2 and 3) with the result being, as noted previously, solder failure.

On the other hand, if no detinning takes place because of the absence of the silicate, the oxygen will rust points of exposed iron which inescapably are present due to unavoidable flaws, e.g. minute pinholes in the tin coating. This, to, will cause perforation of the can and failure thereof. The sodium orthosilicate employed in the formulation of the present invention gives the high pH necessary for oxygen consumption and it is also believed that the specific nature and proportion range of the surfactant, i.e., one of the water-soluble salts of alkyl benzene sulphonic acid, has much to do with hydrogen formation. By using this particular type of surfactant in the range specified the formulation of the present invention successfully suppresses continuation of hydrogen generation.

EFFECT ON GLASS

Solutions containing sodium silicate in any of its forms tend to form a coating of silicon dioxide on glass surfaces under prevailing conditions when allowed to remain in contact with the glass and when exposed to air. This occurs over a period of about an hour depending upon various conditions such as film thickness and silicate concentration. The silicon dioxide is not readily removable because it adheres to glass. It is believed that there is a tendency for it to cement to glass. This formation is a serious product deficiency. Said formation is a function of the silicon dioxide content in the silicate and the complexing capability of the formulation which might tend to prevent silicon dioxide formation. The formulation of the present invention avoids deposits of silicon dioxide by using sodium orthosilicate rather than sodium metasilicate and by using the orthosilicate in a reduced, i.e., low, amount, which is to say within the range specified. The formation of the silicon dioxide furthermore is reduced according to the present invention by using an amount of tetrapotassium pyrophosphate approximately equal to the amount of the silicate since this provides more phosphate per molecule of silicon dioxide.

FOAM CONTROL

The demand in the marketplace is for a multi-purpose cleaner which when sprayed on to a surface will form a foam that will remain as a thin uniform foam for a lengthy (more than evanescent) period of time, e.g., 30 seconds, so that when this foam is on a vertical or ceiling surface, there will be no tendency for it to run or drip. However, stability of foam is not sufficient, because if the foam is overly stable it will not break down when it is wiped with a sponge or rag. This can be very frustrating to a housewife because she expects the foam to disappear as she passes her wiping implement over it. If she leaves streaks of foam behind her or if the foam piles up on the wiping implement she will not repurchase the cleaner. All of this is extremely annoying and can be a serious point of product inferiority. It is not difficult to obtain a stable foam in the first place, but to formulate a stable foam which is pressure-breakable is far more difficult.

The present formulation overcomes this problem by employing a specific surfactant, to wit, diethanolamine lauric and/or cocoa acid amide and a specific foam breaker, to wit, a volatile hydrocarbon such as described previously, these two materials being present within certain critically restricted ranges. The reason for ranges is that it sometimes is desired, for certain products, to have a foam somewhat less pressure-breakable than for other products or somewhat more stable than for other products.

The addition of the volatile hydrocarbon in the proportions mentioned heretofore, i.e., up to 1%, will control the foam so that the foam is stable and yet will break down under wiping pressure. This is possible because of the amount and nature of the surfactant and the dielectric constant of the water phase that has been lowered sufficiently by the presence of the specified range of monobutylether of ethylene glycol.

The volatile hydrocarbon can include from 8 to 12 carbon atoms. It must have at least 45% of aliphatics, these being either straight or branched chain. The longer the carbon chain the more quickly the foam will be broken. It must not have more than 20% of aromatic hydrocarbons nor more than 40% of naphthenic hydrocarbons. The IBP must be between 240° F. and 350° F. and the DP must be between 280° F. and 400° F. Several commercial volatile hydrocarbons have been mentioned above. At this point it also may be mentioned that there may be employed any of the individual hydrocarbons coming within the foregoing definition. They may be used individually or in any blended mixture whatsoever. Typically, examples of the various individual hydrocarbons are:

C8

Octane (n); 2,2,3,3-tetramethyl-butane; 2,2,3-trimethyl-pentane; 2,2,4-trimethyl-pentane; 2,3,3-trimethyl-pentane; 2,3,4-trimethyl-pentane; 2-methyl-3-ethyl-pentane; 2,3-dimethyl-hexane; 2,4 - dimethyl-hexane; 2,5 - dimethyl-hexane; 3,4-dimethyl-hexane; 3-ethyl-hexane; 2-methyl-heptane; 3-methyl-heptane; 4-methyl-heptane.

C9

Nonane (n); 2-methyl-octane; 2,4 - dimethyl-heptane; 2,5-dimethyl-heptane; 2,6-dimethyl-heptane; 4-ethyl-heptane; 3-methyl-octane; 4-methyl-octane.

C10

Decane (n); 2-methyl-nonane; 2,6-dimethyl-octane; 2,7-dimethyl-octane.

C11

Undecane (n); 2-methyl-decane.

C12

Dodecane (n); 2,4,5,7-tetramethyl-octane.

It is within the ambit of the invention, if easy foam breaking is not desired, which on some occasions is the case, to eliminate the volatile hydrocarbons from the formulation, this being quite apparent from the zero lower limit for the volatile hydrocarbon range.

GERMICIDAL ADAPTABILITY

Chlorinated phenols are generally preferred as germicides because they are very active on microbial and other unwanted organisms but are not very dangerous to humans. In addition, they are economical and are easily solubilized in water. However, characteristically they lose their effectiveness at high pH's. This is due to the fact that chlorinated phenols are weak acids that ionize and form salts in moderately strong alkaline solutions. Ionized molecules will not penetrate the membranes in which germs are ensheathed.

However, pursuant to the present invention, it has been discovered that 4-chloro-2-cyclopentol phenol is active at a pH as high as 12 providing that sufficient monobutylether of ethylene glycol is present. The minimum amount of said either is 5.0% nor should more than 7.5% of the ether be present in order to avoid the formation of three liquid phases. For example, 4.5% of the ether is insufficient and substitution of other ethers of a homologous nature will not work. Thus substitution of monoethylether for the monobutylether results in a loss of germicidal properties. It is believed that the monobutylether of ethylene glycol associates at a molecular level so strongly with the 4-chloro-2-cyclopentol phenol that it prevents ionization of this germicide. That the formulation of the present invention is a delicate balance is indicated by the fact that an increase to 1% of the water-soluble salt of the alkyl benzene sulphonic acid content will cause sufficient change in the properties of the concentrate to inactivate the germicide.

CLEANING POWER AND CLEANING COEFFICIENT

Alkalinity, building power (sequestering), surface activity and solvent power are all factors that increase cleaning but, unfortunately, they also increase removal of paint from walls which is certainly undesirable for a household cleaner. An empirical cleaning coefficient has been developed which is the cleaning power divided by the amount of paint removal. The higher the coefficient obviously the more efficient the cleanser will be because it can clean the surface without deteriorating the surface, i.e., without removing the paint. The high cleaning power and the cleaning coefficient of the instant formulation is due to the specific cleaners and their proportions.

SYNOPSIS OF THE INVENTION

An essential innovation of the formulation of the present invention, aside from the close control of the quantity used, is the substitution of sodium orthosilicate (60.8% $Na_2O$) for sodium metasilicate (50% $Na_2O$). By doing this, the pH control is maintained (the pH only increases slightly from 12.05 to 12.15), as is the alkalinity, to assure consumption of tin with consequent removal of oxygen. However, the precipitation hazard is reduced by lowering the percentage of silicon dioxide (as a silicate), as is the tendency to deposit silicon dioxide on glass. Yet the desired level of cleaning power is maintained. Accordingly, pursuant to the invention, 0.5% of sodium orthosilicate can be substituted for 1.0% of sodium orthosilicate, maintaining sufficient alkalinity for oxygen consumption in the cleaner, but reducing the silicate to a point where it can be properly complexed with only 0.5% tetrapotassium pyrophosphate thereby assuring minimum precipitation and minimum size of crystal precipitate and no observable deposition of silica on glass.

At the 0.5% level of the tetrapotassium pyrophosphate, there is no three liquid phase formation, even with the high amount, to wit, 7.5%, of the monobutylether of ethylene glycol as there is with 1% phosphate. The 7.5% level of the monobutylether of ethylene glycol provides a high level which creates a good cleaning power and strong germicidal action with the addition of the particular chlorinated phenol.

By way of comparison, to make the formulation of Example B suitable for packaging in an aerosol can, the sodium metasilicate would have to be reduced to 0.3% and the tetrapotassium pyrophosphate to 0.5% in order to eliminate precipitation. This would lower the cleaning power to below the desired level and would increase the hazard of pitting and precipitation if in the course of a production run the vacuum were lost on some cans so that these cans had a high oxygen content in their heads. In such event, the reaction between the oxygen and the tin plating would reduce the alkalinity to a point where the pH fell below 11 and pitting would consequently take place.

To make the formulation of Example A a suitable competitor in the commercial market the monobutylether of ethylene glycol would have to be increased to about a 6% level from the 3% used. This would reduce the foaming somewhat but would bring the paint removable capability to a dangerously high level in view of the surfactant components. Moreover, the danger of precipitation would be increased and, more seriously, the system would convert more strongly to three liquid phases than it did previously. Furthermore, it is doubtful whether with this change the system could be made germicidable.

From the foregoing it will be apparent that the specific ingredients recited and the ranges of proportions set forth in the formulation of the present invention are necessary and critical.

It thus will be seen that there has been provided a containerized product which achieves the various objects of the present invention and is well adapted to meet the conditions of practical use.

As various possible embodiments might be made of the above invention and as various changes might be made in the embodiment above set forth it is to be understood that, except as otherwise specified hereinabove, the material described is to be interpreted as illustrative and not in a limiting sense.

What is claimed as new and is desired to be secured by Letters Patent is:

1. A liquid cleaning composition packed in a tin plated iron aerosol can, said composition consisting of:

| | Ranges in percent by weight |
|---|---|
| A water-soluble salt of alkyl (C8 to C12 benzene sulphonic acid | 0.2–0.5 |
| Sodium orthosilicate | 0.4–0.55 |
| Tetrapotassium pyrophosphate | 0.4–0.55 |
| A solubilizer selected from the group consisting of diethanolamine lauric acid amide, diethanolamine cocoa acid amide and mixtures thereof | 0.2–0.4 |
| Ethylene glycol monobutylether | 5.0–7.5 |
| Orthophenyl phenol | 0.0–0.2 |
| 4-chloro-2-cyclopentol phenol | 0.08–0.2 |
| Volatile hydrocarbon (containing at least 45% aliphatic hydrocarbons (C8–12) not in excess of 20% aromatic hydrocarbons and not in excess of 40% naphthenic hydrocarbons, initial boiling point 240°–350° F., dry point 280°–400° F.) | 0–1.0 |
| Deionized water, q.s. to 94–97. | |
| Propellant | 3–6 |

2. A cleaning composition as set forth in claim 1 wherein the formulation constitutes:

| | Percent by weight |
|---|---|
| Triethanolamine alkyl (C8 to 12)-benzene sulphonate | 0.3 |
| Sodium orthosilicate | 0.5 |
| Tetrapotassium pyrophosphate | 0.5 |
| A solubilizer selected from the group consisting of diethanolamine lauric acid amide, diethanolamine cocoa amide acid and mixtures thereof | 0.2 |
| Ethylene glycol monobutylether | 7.0 |
| Orthophenyl phenol | 0.1 |
| 4-chloro-2cyclopentol phenol | 0.08 |
| Volatile hydrocarbon (containing at least 45% aliphatic hydrocarbons (C8–12) not in excess of 20% aromatic hydrocarbons and not in excess of 40% naphthenic hydrocarbons, initial boiling point 240° F.–350° F., dry point 280° F.–400° F.) | 0.5 |
| Deionized water, q.s. to 95. | |
| Isobutane | 5.0 |

References Cited
UNITED STATES PATENTS

| 3,210,287 | 10/1965 | Kelly et al. | 252—139 |
| 3,222,287 | 12/1965 | Laughlin | 252—135 |
| 3,304,330 | 2/1967 | Yoke et al. | 252—135 |
| 3,354,088 | 11/1967 | Elmquist | 252—139 |
| 3,419,658 | 12/1968 | Sanders | 252—305 |

OTHER REFERENCES

Livingstone: "Surfactants in Household Aerosol Products," Soap. Chem. Spec., March 1967, pp. 131, 134, 135, 162, 164.

LEON D. ROSDOL, Primary Examiner

W. SCHULZ, Assistant Examiner

U.S. Cl. X.R.

252—106, 135, 138, 139, 307, 358